United States Patent
Wade (10) Patent No.: US 6,318,295 B1
(45) Date of Patent: Nov. 20, 2001

(54) MULTI-LEVEL KENNEL ENCLOSURE WITH FORCED VENTILATION

(76) Inventor: Paul R. Wade, P.O. Box 480, Manchester, ME (US) 04351

( * ) Notice: Subject to any disclaimer, the term of this patent is extended or adjusted under 35 U.S.C. 154(b) by 0 days.

(21) Appl. No.: 09/532,439

(22) Filed: Mar. 23, 2000

(51) Int. Cl.⁷ ..................................................... A01K 1/02
(52) U.S. Cl. ........................... 119/500; 119/479; 119/421
(58) Field of Search ................................ 119/479, 458, 119/500, 161, 165, 421, 702, 705, 455, 416, 452, 707; 446/476

(56) References Cited

U.S. PATENT DOCUMENTS

| | | |
|---|---|---|
| D. 349,783 | 8/1994 | Berger . |
| D. 370,093 | 5/1996 | De Luca . |
| 2,725,036 | 11/1955 | Petrie . |
| 2,821,165 | 1/1958 | Wright . |
| 3,160,140 | 12/1964 | Porter . |
| 3,177,848 | 4/1965 | Rubricius . |
| 3,561,757 | 2/1971 | Schillig . |
| 3,662,713 | 5/1972 | Sachs . |
| 3,919,978 * | 11/1975 | Schaefer ........................ 119/500 |
| 4,021,975 | 5/1977 | Calkins . |
| 4,301,766 | 11/1981 | Piccone . |
| 4,347,807 | 9/1982 | Reich . |
| 4,359,837 | 11/1982 | Hool . |
| 4,497,279 | 2/1985 | Bell . |
| 4,803,952 | 2/1989 | Houser . |
| 4,844,016 | 7/1989 | Filosa . |
| 4,850,306 | 7/1989 | Nitkin . |
| 5,010,848 * | 4/1991 | Rankin ........................... 119/461 |
| 5,050,536 * | 9/1991 | Baker ............................. 119/499 |
| 5,054,427 | 10/1991 | Hoover . |
| 5,078,094 * | 1/1992 | Hoover . |
| 5,080,042 | 1/1992 | Rubin . |
| 5,092,277 | 3/1992 | Baillie et al. . |
| 5,095,852 | 3/1992 | Hoover . |
| 5,134,969 * | 8/1992 | Mason et al. .................. 119/472 |
| 5,134,972 * | 8/1992 | Compagnucci ................ 119/165 |
| 5,247,901 | 9/1993 | Landon et al. . |
| 5,320,065 | 6/1994 | Leopold . |
| 5,655,478 * | 8/1997 | Kiera ............................. 119/165 |
| 5,738,040 * | 4/1998 | Simmons ....................... 119/165 |
| 5,765,505 | 6/1998 | Yun . |
| 5,954,013 | 9/1999 | Gabriel et al. . |
| 5,975,017 * | 11/1999 | Cameron ....................... 119/165 |
| 6,123,047 * | 9/2000 | Sakai ............................. 119/452 |
| 6,209,490 * | 4/2001 | Schwede ........................ 119/472 |

FOREIGN PATENT DOCUMENTS 2 148 087 A    10/1984    (GB) .

* cited by examiner

Primary Examiner—Charles T. Jordan
Assistant Examiner—Yvonne R. Abbott (57) ABSTRACT

A multi-level kennel enclosure includes a structure formed by left and right side walls, top and bottom walls and back and front walls defining an interior. A shelf is mounted in the interior so as to divide the interior into an upper section defining a living section and a separate lower section including a toilet section. An opening in the shelf allows an animal in the interior to pass between the living section and the toilet section. The front wall includes a pivotable first door selectively movable from a closed position to an open position to provide access to the living section. The front wall further includes a pivotable second door selectively movable from a closed position to an open position to provide access to the toilet section. The front wall also includes a ventilation panel through which air can flow into the interior. A plurality of additional shelves divide the interior into a plurality of levels through which an animal can pass. The toilet section defines a space to accommodate a receptacle for holding waste deposited by the animal. A forced ventilation system including a ventilation passage vents unpleasant odors from the enclosure. A plurality of multi-level kennel enclosures can be arranged side by side with their ventilation passages in alignment to form a continuous ventilation duct.

20 Claims, 7 Drawing Sheets

MULTI-LEVEL KENNEL ENCLOSURE WITH FORCED VENTILATION

BACKGROUND OF THE INVENTION

1. Field of the Invention

The present invention relates to kennel structures or enclosures and, more particularly, to multi-level kennel enclosures for humane and sanitary confinement of animals including domestic animals or pets such as cats.

2. Discussion of the Prior Art

In the past, it has been difficult to provide adequate kennel space for cats. Kenneling, keeping or confining feline pets in traditional plastic box-shaped kennels has been undesirable since cats have an innate need to climb or jump, and since the sanitary habits of cats are different than those for dogs and other domestic animals.

Cages are not desirable for keeping cats, since the structure of feline paws is not suited to walking on spaced wire surfaces. Cages are also not suitable when stacked or arranged in close proximity to one another, as often occurs in a commercial kennel or retail store, because cats, being naturally social, curious and capable of aggression, can reach through the walls of the cages and possibly do harm to the cats or other animals kept in neighboring cages.

Cats typically are house-trained to use a litter box and will keep themselves sanitary and clean if given the opportunity or environment to do so. It has been difficult to maintain the sanitary conditions needed for cats in a boarding kennel or a retail store, since keeping a litter box and a cat in the same small space requires that the cat be disturbed whenever the litter box is removed or cleaned. Also, cats prefer not to be restricted to the area of their litter box, as is the case where the cat and its litter box are confined in the same small space. Many cat owners own more than one cat and would prefer that their cats be housed together when boarded. Such an accommodation would be detrimental to the cats in the case of small space plastic box-shaped kennels and wire cages.

Cat owners are particularly devoted to their pets and, given a choice, would prefer that their cats be kept in a large space where a sleeping area, eating area and an area for a litter box are widely separated. Cat owners would also prefer that their cats be free to move about and provided with structure on which to jump and climb, as opposed to being cooped up in a box-shaped plastic kennel or wire cage. While large, unrestricted kennel spaces or areas are desirable, it is impractical in a commercial establishment to provide a large kennel space for each cat. It is also not feasible to provide a large, unrestricted kennel space or area for even a small number of cats that are unfamiliar to one another, since the cats freely roaming around the kennel space or area could create a situation in which the cats might harm one another. Cat owners often are forced to hire in-house pet sitters when on travel, since boarding kennels have proven so unsatisfactory.

Those seeking to provide kennel or boarding services for domesticated cats are thus confronted with the problem of safely keeping a large number of cats in a commercial space of practical size while meeting the hygiene requirements of the cats and the preferences of cat owners. There has been a long felt need, therefore, for a practical solution to the problem of safely boarding a number of cats or other animals in a sanitary manner while allowing the cats or other animals to engage in their normal activities.

OBJECTS AND SUMMARY OF THE INVENTION

Accordingly, it is a primary object of the present invention to overcome the above mentioned difficulties by providing a multi-level kennel enclosure with adequately arranged space and forced ventilation.

Another object of the present invention is to safely keep a cat in a kennel enclosure occupying a relative small amount of floor space while avoiding sanitation related problems.

A further object of the present invention is to confine a cat in a kennel enclosure occupying a relatively small amount of floor space while providing the cat sufficient space to freely move about.

An additional object of the present invention is to confine a cat in a kennel enclosure occupying a relatively small amount of floor space while providing the cat with structure conducive to climbing and/or jumping.

It is another object of the present invention to actively ventilate or evacuate the objectionable odors emanating from a soiled cat litter box provided in a confined kennel space.

The present invention also has as an object to provide a multi-level kennel enclosure formed of a plurality of flat panels capable of being assembled, disassembled and/or reassembled with relative ease.

Yet a further object of the present invention is to provide a multi-level kennel enclosure having a living section and a separate toilet section accessed, respectively, by separate doors.

Some of the advantages of the present invention are that a desired plurality of multi-level kennel enclosures can be arranged side by side, each multi-level kennel enclosure has sufficient room to accommodate more than one cat if so desired, separation anxiety is reduced for cats that normally live together since they can be safely and comfortably accommodated in the same kennel enclosure, the kennel enclosure includes a large expanse of window allowing the cat to view its surroundings and allowing a caretaker to visually but unobtrusively evaluate and monitor the cat as well as its supply of food and water, the doors can be provided with suitable latches to prevent inadvertent opening thereof and unplanned release of a cat from the enclosure, the enclosure is designed to promote movement of a cat between adjacent interior levels, plural multi-level kennel enclosures arranged side by side in close relation allow many cats to be kenneled while occupying a relative small amount of floor space, access by the cats to cats in neighboring or adjacent kennel enclosures is normally prevented but can be allowed via selectively openable access panels on the sides of adjacent enclosures, odors emanating from the toilet section can be vented to the outside, the ventilation passages of adjacent enclosures are connectible in series, cat beds or other sleeping structures can be placed on desired shelves of the living section while the litter box is contained in the toilet section separate from the living section, eating and/or drinking dishes or bowls can be placed on desired shelves in the living section and, if desired, can be placed at different levels than those allocated for sleep and/or play, a lower section of the interior of the enclosure contains the toilet section as well as a storage compartment, the enclosure can be faced in hardwood, such as cabinet grade oak, cherry, maple, walnut or other fine hardwood, giving the enclosure the attractive appearance of a fine china cabinet, interior surfaces are capable of being easily cleaned and sanitized, the enclosure in an unassembled condition is amenable to packaging in conventional boxes or containers for shipment to an installation site, and cat owners are able to readily appreciate the superiority of the multi-level kennel enclosure to box-shaped plastic kennels and/or wire cages.

These and other objects, advantages and benefits are realized with the present invention as generally characterized in a multi-level kennel enclosure comprising a cabinet or townhouse-like structure or enclosure having multiple levels or floors vertically arranged within the interior of the enclosure. A plurality of the multi-level kennel enclosures may be arranged or installed side by side to form an array of multi-level kennel enclosures occupying a relatively small amount of floor space. Each kennel enclosure is capable of accommodating one or more cats. Typically, each kennel enclosure will house a single cat for maximum personal space and sanitation. However, a single kennel enclosure can comfortably and safely accommodate more than one cat as may be desirable, for example, when it is in the best interest of particular cats to be kept together and not separated. The multi-level kennel enclosure includes left and right side walls, top and bottom walls, a back wall, an upper front door and a lower front door defining an interior. The upper door provides access to an upper section of the interior defining a living section, and the lower door provides access to a lower section of the interior including a toilet section. The upper door includes a window so that a caretaker can visually but unobtrusively evaluate and monitor a cat within the interior as well as supplies of food or drink contained therein. In a preferred embodiment, the kennel enclosure has six levels, four levels defining the upper section and two levels defining the lower section. A first or top level in the enclosure is defined between the top wall and a topmost horizontal shelf having a continuous or solid upper surface. The topmost horizontal shelf is of lesser depth than the depth of the enclosure interior, thusly affording access to a second level disposed below the first level. The second level is defined between the topmost shelf and an upper shelf having a depth close to the depth of the interior. The upper shelf has a solid or continuous upper surface and has an opening therein providing access to a third level disposed below the second level. The third level is defined between the upper shelf and a middle shelf having a solid or continuous upper surface. The middle shelf has a depth less than the depth of the interior of the enclosure whereby access is provided between the third level and a fourth level disposed below the third level. The fourth level is defined between the middle shelf and a lower shelf having a depth substantially equal to the depth of the interior of the enclosure. The lower shelf has a solid or continuous upper surface and an opening is disposed in the lower shelf by which access is provided between the fourth level and the lower section of the interior. The first, second, third and fourth levels correspond to the living section, which is the upper section of the interior defined between the lower shelf and the top wall of the enclosure. The lower section of the interior is defined between the lower shelf and the bottom wall of the enclosure and includes the toilet section. The lower section defines fifth and sixth levels of the enclosure. The fifth level is defined between the lower shelf and a horizontal wall of an exhaust housing disposed in the lower section. The horizontal wall of the exhaust housing has a solid or continuous upper surface and is of lesser depth than the depth of the enclosure interior so as to provide access to the sixth level, which is defined by the bottom wall of the enclosure. The sixth level defines an area for accommodating a litter box or otherwaste receptacle, and the exhaust housing includes an inlet opening located adjacent this area. A cat is able to move upwardly and downwardly between the litter box and the living section via the horizontal wall of the exhaust housing and the opening in the lower shelf. An exhaust device, such as a fan, is disposed in the exhaust housing to cause air from the enclosure to be drawn therein. The enclosure has a front facing ventilation panel near the top thereof, such that fresh air enters the enclosure at or near the top and moves downwardly through the enclosure into the exhaust housing for removal or evacuation through a ventilation passage. The exhaust housing can be vented to the outdoors. The ventilation passages of adjacent multi-level kennel enclosures are in alignment to form a continuous ventilation duct through adjacent kennel enclosures.

These and other objects, advantages and benefits of the present invention will become apparent upon consideration of the following detailed description of preferred embodiments thereof, particularly when taken in conjunction with the accompanying drawings, wherein like reference numerals in the various figures are utilized to designate like components.

DESCRIPTION OF THE PREFERRED EMBODIMENTS

A multi-level kennel enclosure 10 according to the present invention is illustrated in FIGS. 1, 2, 3 and 4 and includes a tall, narrow, rectangular box-shaped cabinet, structure or enclosure. The kennel enclosure 10 is defined by a planar and preferably solid left side wall 12, a planar and preferably solid right side wall 14 parallel to left side wall 12, a planar and preferably solid top wall 16 perpendicular to left and right side walls 12 and 14, a planar and preferably solid bottom wall 18 parallel to top wall 16, a planar and preferably solid back wall 20 perpendicular to the left and right side walls, and a front wall 22. An upper edge of left side wall 12 is juxtaposed with a left side edge of top wall 16. An upper edge of right side wall 14 is juxtaposed with a right side edge of top wall 16. A rearward edge of top wall 16 is juxtaposed with an upper edge of back wall 20. Left and right side edges of back wall 20 are juxtaposed with rear edges of left and right side walls 12 and 14, respectively. A lower edge of back wall 20 is juxtaposed with a rear edge of bottom wall 18. Left and right side edges of bottom wall 18 are juxtaposed with lower edges of left and right side walls 12 and 14, respectively. Preferably, the enclosure 10 is supported on a suitable toe space structure 24 interposed between the bottom wall 18 and a floor or other support surface.

Front wall 22 includes a planar and preferably solid first or upper door 26, a planar and preferably solid second or lower door 28 and a planar ventilation panel or grate 29. Upper door 26 has a side edge thereof hingedly or pivotally mounted to a corresponding forward edge of left or right side walls 12 and 14. In the case of multi-level kennel enclosure 10, the left side edge of upper door 26 is pivotally mounted to the forward edge of left side wall 12 for movement between an open position, shown in FIG. 1, and a closed position, shown in FIG. 2. Lower door 28 similarly has a side edge thereof hingedly or pivotally mounted to a corresponding forward edge of left or right side walls 12 and 14. In the case of multi-level kennel enclosure 10, the left side edge of lower door 28 is pivotally mounted to the forward edge of left side wall 12 for movement between an open position, shown in FIG. 1, and a closed position, shown in FIG. 2. The lower door 28 is mounted below the upper door 26 and is movable between the open and closed positions independently of the upper door. It should be appreciated that either side edge of either door can be pivotally mounted to the forward edge of the corresponding left or right side walls 12 and 14. The upper door 26 is substantially taller than the lower door 28 and includes a preferably solid, rectangular panel or window 30 made of safety or tempered glass or some other durable transparent or translucent material such as plastic. Lower door 28 includes a preferably solid panel 31, preferably made from an opaque material but optionally made of a transparent or translucent material. Preferably, enclosure 10 is fabricated from cabinet grade wood and, preferably, hardwoods such as oak, cherry, maple or walnut. The window of upper door 26 and the panel of lower door 28 are preferably framed in wood, as represented by framing 32, to provide an attractive appearance. Preferably, hidden, concealed or non-visible hinges are used to hingedly or pivotally mount the upper and lower doors to the side walls. The upper and lower doors are preferably provided with latch assemblies 34 by which the doors can be locked in a closed position, and such latch assemblies can be self-latching or self-locking. The ventilation panel 29 is disposed above the upper door and has a mesh or open cell construction to allow the flow of air therethrough.

The multi-level kennel enclosure 10 defines an interior that is substantially rectangular in shape having a major axis along a vertical dimension or height thereof and a minor axis along a horizontal dimension or width thereof. The height of the interior is defined between top wall 16 and bottom wall 18, and the width of the interior is defined between left and right side walls 12 and 14. The interior has a depth between back wall 20 and front wall 22. The interior is divided into a plurality of separate levels by planar horizontal shelves, platforms or walls made of a durable material having an easily cleanable surface. Accordingly, the enclosure has a townhouse-like design.

Figure 1:
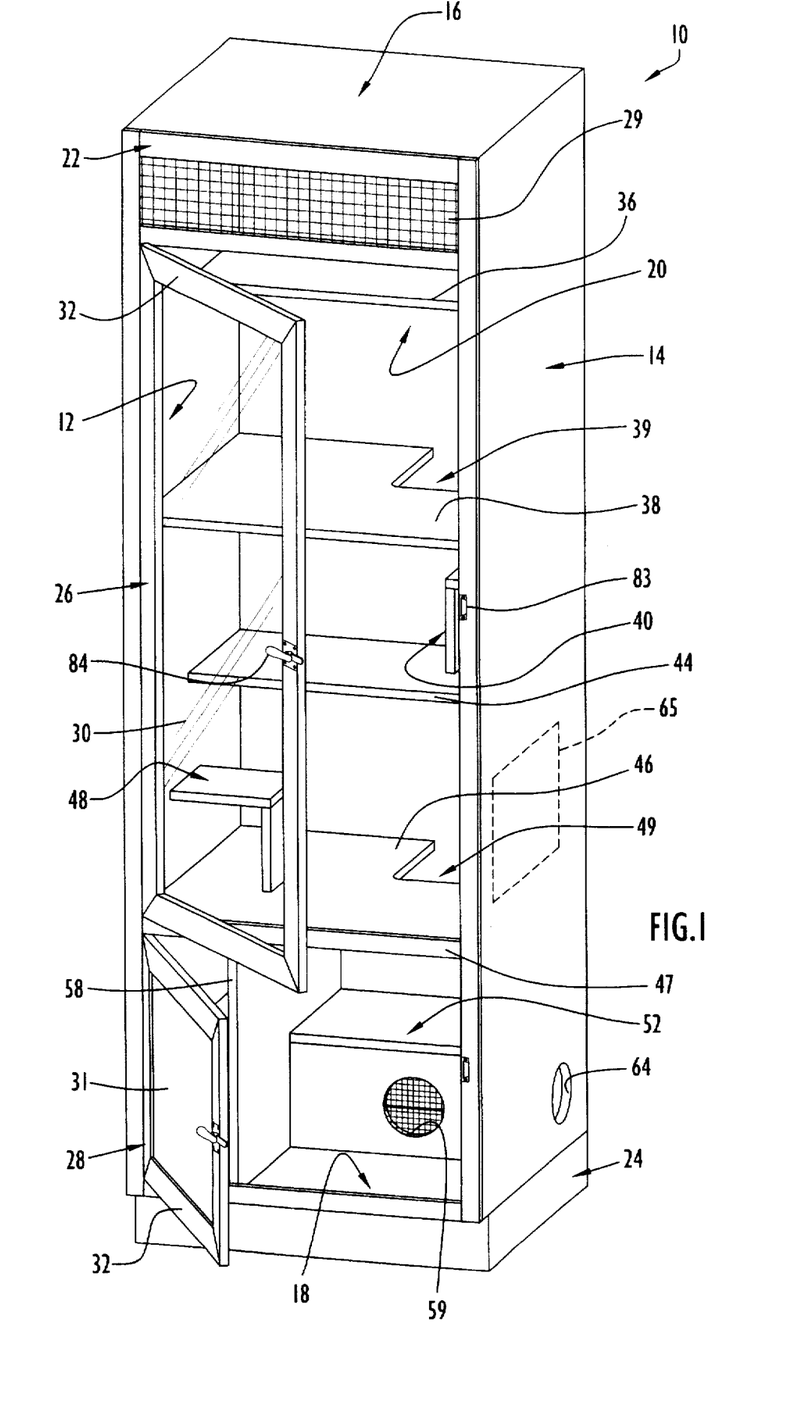
FIG. 1 is a front perspective view of a multi-level kennel enclosure according to the present invention showing the upper and lower doors thereof in an open position.
Figure 3:
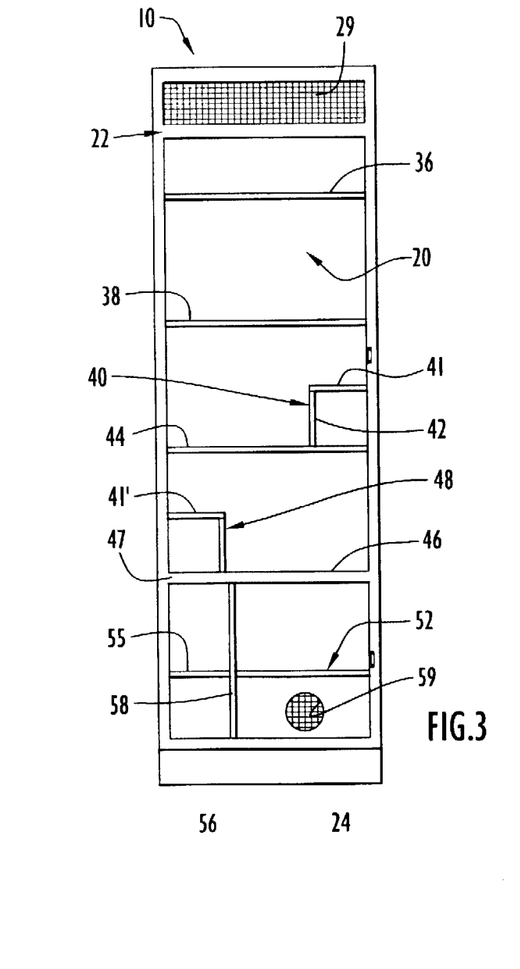
FIG. 3 is a front view of the multi-level kennel enclosure without the upper and lower doors and illustrating the relative positions of the shelves and steps.
Figure 4:
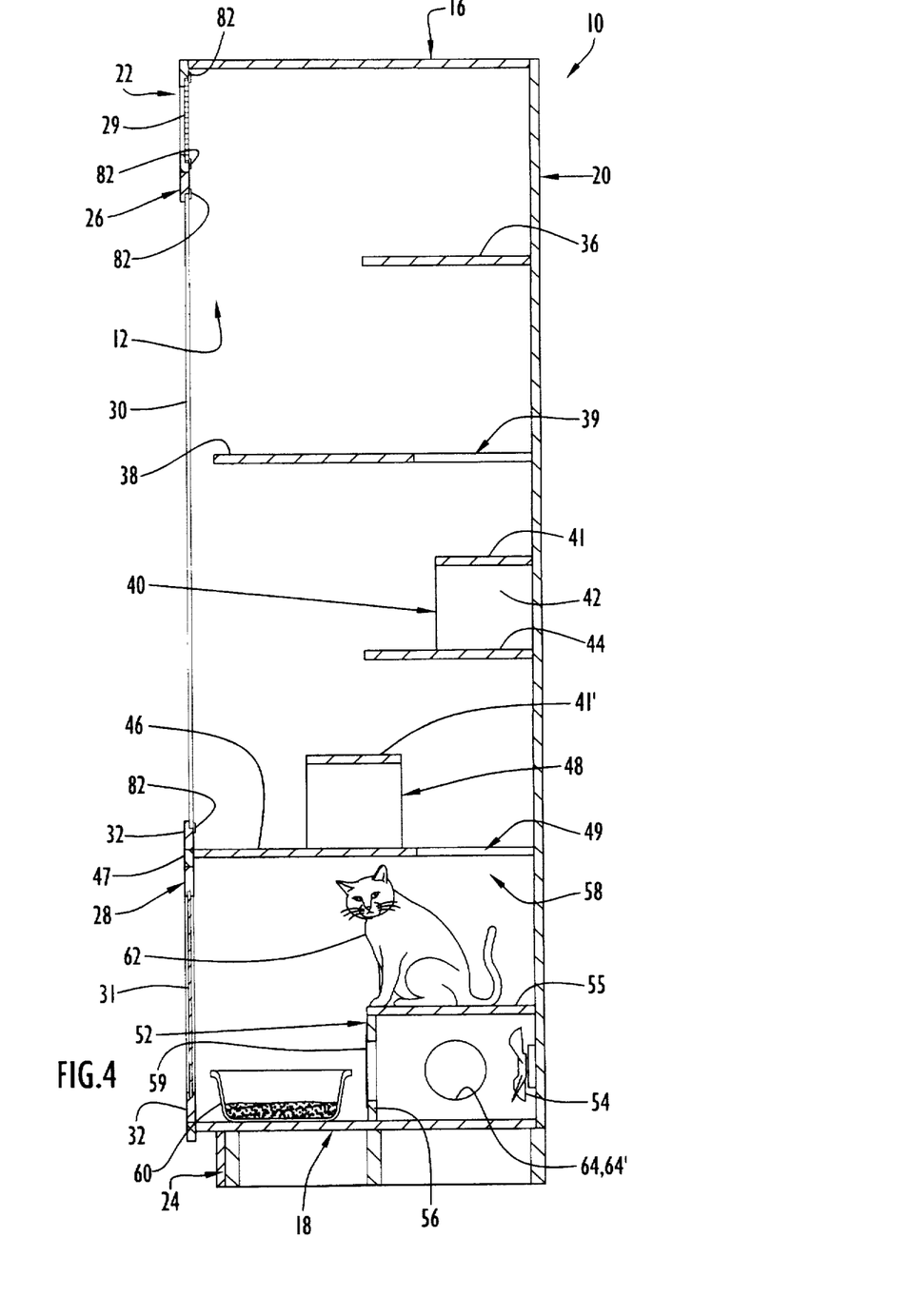
FIG. 4 is a side sectional view of the multi-level kennel enclosure illustrating the depth dimensions for the shelves, steps and exhaust housing.

As best seen in FIGS. 1, 3 and 4, an uppermost or topmost planar horizontal shelf 36 extends forwardly from the back wall 20 approximately midway, i.e. half the depth, into the interior and extends laterally between the left and right side walls 12 and 14. A first or topmost level providing a loft or attic-like space is defined between topmost shelf 36 and top wall 16. The topmost shelf 36 has a solid or continuous upper surface conducive to supporting a resting or moving cat thereon. At approximately eye level within the kennel enclosure 10 is a second level, which is defined between a planar, horizontal upper or top shelf 38 and the topmost shelf 36. Upper shelf 38 extends laterally between the left and right side walls 12 and 14 and extends forwardly from the back wall 20 to terminate a small distance inwardly of upper door 26. A cat is able to move up and down between the first and second levels via the space provided between the forward edge of the topmost shelf 36 and the upper door 26.

As best seen in FIGS. 1 and 4, upper shelf 38 has a solid or continuous upper surface for comfortably supporting a cat and has an opening or cut-out 39 therein, the opening 39 being substantially square and located at the right rear corner of enclosure 10. The opening 39 has a depth about half the depth of the upper shelf 38 and a width about half the width of the upper shelf 38. The opening 39 is disposed over a first or middle step 40, best seen in FIGS. 3 and 4. Middle step 40 is of box-like construction and includes a planar and horizontal tread member 41 and a vertical riser member 42. The horizontal member 41 extends laterally, i.e. to the left, from right side wall 14 and extends forwardly from the back wall 20. The vertical member 42 extends forwardly from the back wall 20 and extends downwardly from a left side edge of the horizontal member 41 to a middle shelf 44. The horizontal and vertical members 41 and 42 extend forwardly from the back wall 20 less than the depth of opening 39, and the horizontal member 41 extends laterally from the right side wall 14 less than the width of opening 39. The horizontal member 41 has a solid or continuous upper surface providing a smooth surface upon which a cat can step when passing between the second level and a third level of the enclosure. Middle shelf 44 is planar and horizontal and extends laterally between the left and right side walls 12 and 14 and forwardly from the back wall 20 about the same distance as topmost shelf 36. The third level is defined between middle shelf 44 and upper shelf 38. The middle shelf 44 has a solid or continuous upper surface conducive to supporting a cat thereon. A cat is able to move upwardly and downwardly between the second and third levels via the opening 39 and step 40.

Beneath middle shelf 44 is a planar and horizontal lower shelf 46 which divides the interior of the enclosure 10 into an upper section and a lower section. Also, a fourth level is defined between the lower shelf 46 and the middle shelf 44. The lower shelf 46 extends laterally between the left and right side walls 12 and 14 and extends forwardly from the back wall 20 to the front wall 22, with a forward edge of the lower shelf 46 in abutment with a laterally extending divider strip 47 forming part of front wall 22 and disposed between the upper and lower doors 26 and 28. The upper section of the kennel enclosure interior is located above the lower shelf 46, and the lower section of the kennel enclosure interior is located below the lower shelf 46. Access to the upper section is provided via the upper door 26 while access to the lower section is provided via the lower door 28. When the doors 26, 28 are closed, the upper and lower sections, respectively, are also closed.

A second or lower step 48, similar to step 40, is disposed on lower shelf 46 with the horizontal member 41' thereof extending laterally, i.e. to the right, from the left side wall 12. As best seen in FIG. 4, the horizontal member 41' of lower step 48 is disposed approximately midway between the back wall 20 and the upper door 26 so as to be disposed forwardly of middle shelf 44. A cat is able to move upwardly and downwardly between the third and fourth levels via lower step 48 and the space between the forward edge of middle shelf 44 and upper door 26. The lower shelf 46 has an upper surface that is solid or continuous to enhance support and comfort of a cat thereon. The upper section of the interior is a living section made up of the first, second, third and fourth levels. The lower shelf 46 has an opening or cut-out 49, similar to opening 39, located at the right rear corner of the enclosure 10. The opening 49 allows a cat to move upwardly and downwardly between the upper section, i.e. the living section, and the lower section, which is disposed below the lower shelf 46 and includes a toilet section of the enclosure.

The lower section, which defines fifth and six levels in enclosure 10, is defined between lower shelf 46 and bottom wall 18. A forced ventilation system is disposed in the lower section and includes a rectangular, box-like exhaust housing 52 housing or enclosing an exhaust device such as a fan or blower, represented at 54 in FIG. 4, adapted to effect the drawing in of air from the enclosure interior into the housing 52. The exhaust device is adapted to create a negative pressure or vacuum causing air within the enclosure to be drawn into the exhaust housing, whereby fresh outside air is drawn into the enclosure interior, such as via ventilation panel 29. The housing 52 includes a planar horizontal wall 55 and a vertical wall 56. The horizontal wall 55 extends laterally between left and right side walls 12 and 14 and extends forwardly from back wall 20 about half the depth of the enclosure interior. The fifth level is defined between the horizontal wall 55 and the lower shelf 46, with the space between the forward edge of the horizontal wall 55 and the lower door 28 affording access to the sixth level disposed below the fifth level. Access to the fifth level from the living section is afforded by opening 49 in lower shelf 46. The vertical wall 56 extends laterally between left and right side walls 12 and 14 and extends downwardly from the forward edge of horizontal wall 55 to bottom wall 18. The horizontal wall 55 has a solid or continuous upper surface conducive to supporting a cat thereon. The sixth level is defined by the bottom wall 18 forwardly of the vertical wall 56.

A partition 58 extends vertically between lower shelf 46 and bottom wall 18 and partitions the lower section into a left compartment and a right compartment. The partition 58 is formed by a planar panel having a notch or cut-out therein sized to receive or fit around the housing 52. The partition 58 extends vertically between the top and bottom walls 16 and 18. The partition 58 abuts the back wall 18 and extends forwardly therefrom to divider strip 47. The partition is located between the left and right side walls 12 and 14 to be disposed slightly inwardly of the vertical member of lower step 48. Both the left and right compartments thusly include two levels, the left compartment including left portions of the fifth and sixth levels and the right compartment including right portions of the fifth and sixth levels. The right compartment, i.e. the right portions of the fifth and sixth levels, defines a toilet section that is accessed by a cat via the opening 49 in lower shelf 46, the toilet section being disposed directly below the opening 49. The left compartment, which does not communicate with the toilet section when the lower door is closed, may be used as a storage section.

The vertical wall 56 of housing 52 has a ventilation inlet opening 59 therein shown as having a circular shape but which can be of any desired shape. The inlet opening 59 is disposed in the toilet section and establishes communication with the interior of exhaust housing 52, whereby air from the enclosure interior is drawn into the interior of the exhaust housing. Sufficient space is provided in the sixth level of the toilet section between the vertical wall 56 and the lower door and between the partition 58 and the right side wall 14 to present a space or area for accommodating a cat litter box or other receptacle 60 for holding waste deposited by a cat. The litter box 60 is supported on the bottom wall 18 in the toilet section directly adjacent or in front of the inlet opening of exhaust housing 52. A cat 62, shown in FIG. 4, is able to move between the living section and the litter box 60 via the opening 49 and the exhaust housing 52, the horizontal wall 55 of which serves as a step or platform for cat 62 to access litter box 60.

A ventilation outlet opening 64 is formed in the right side wall 14 in communication with the interior of housing 52. A corresponding ventilation outlet opening 64' is formed in the left side wall 12. The ventilation outlet openings 64, 64' in the left and right side walls are axially aligned to establish a ventilation passage entirely through the enclosure 10. The ventilation passage through the enclosure 10 extends axially along the width of the enclosure, the longitudinal axis of the ventilation passage being perpendicular to the major axis of the enclosure. Malodorous emissions from the soiled litter box 60 are drawn by exhaust device 54 through ventilation inlet opening 59 into the interior of exhaust housing 52 and are swept away along air currents through the ventilation passage to be forcefully vented or exhausted externally of the enclosure via one or both of the ventilation outlet openings 64, 64'. Preferably, one or both of the ventilation outlet openings 64, 64' will be vented to the out of doors. Where only one ventilation outlet opening 64, 64' is utilized, it should be appreciated that the unused ventilation outlet opening can be sealed, plugged or otherwise blocked.

The structural elements of the multi-level kennel enclosure 10 are arranged to permit fresh air to flow into the interior through the ventilation panel 29 and down through the interior before being drawn into exhaust housing 52 and exhausted or forced out through outlet openings 64, 64'. Pillows or other bedding can be arranged on lower shelf 46, middle shelf 44, upper shelf 38 and/or topmost shelf 36. A cat in any of the first, second, third or fourth levels will not be subjected to the odoriferous emissions from a soiled litter box. A water dish and food dish (not shown in the drawings) can be placed at a suitable location in the enclosure, such as on lower shelf 36 where their contents may be easily visually inspected by caretakers through window 30, thusly reserving the other levels of the enclosure for sleep and/or play.

In a preferred embodiment, the multi-level kennel enclosure is 7 feet 6¼ inches tall from the top wall to the bottom wall. The overall width of the enclosure is about 2 feet 6 inches. The left and right side walls, top and bottom walls, back and front walls, topmost shelf, upper shelf, tread members, riser members, middle shelf, lower shelf, the partition and the horizontal and vertical walls of the exhaust housing are all preferably made of ⅝ inch thick panels of suitable material, such as melamine for durability and ease of cleaning. The topmost shelf is about 1 foot 2 inches deep and 2 feet 4½ inches wide, the width of the topmost shelf being equal to the width of the interior. The upper shelf is about 2 feet 2½ inches deep and 2 feet 4½ wide, and the opening therein is about 1 foot by 1 foot with a rounded or radiused inside corner. The middle shelf is about 1 foot 2 inches deep and 2 feet 4½ inches wide. The riser for the step 40 is about 7¼ inches high and 8½ inches deep. The tread member for step 40 rests on the upper edge of the riser member and is about 8½ inches wide and 8½ inches deep, providing an overall step height of about 8 inches. The lower shelf is about 2 feet 5¼ inches deep and 2 feet 4½ inches wide, with the opening therein being about 1 foot by 1 foot with a rounded or radiused inside corner. The riser for step 48 is about 7¼ inches high and 8½ inches deep. The tread member for step 48 rests on the upper edge of the riser member and is about 8½ inches wide and 8½ inches deep, thus providing an overall step height of about 8 inches. The partition is about 1 foot 9 inches high and 2 feet 4½ inches deep with a corner cut-out that is about 9 inches high by 1 foot 2 inches deep. The horizontal wall for the exhaust housing is about 2 feet 4½ inches wide and 1 foot 2 inches deep. The vertical wall for the exhaust housing is about 2 feet 4½ inches wide and 8¼ inches high. The horizontal wall for the exhaust housing rests on the upper edge of the vertical wall, thus providing a step having a height of about 9 inches. The inlet opening is about 4 inches in diameter and is preferably covered by an aluminum or plastic vent cover. The outlet openings are about 4 inches in diameter and may be attached or coupled to tubular vents or plenums, respectively, of suitable length to exhaust air from the interior to the outdoors. A tubular vent or plenum coupling may extend between the outlet openings of adjacent multi-level kennel enclosures so that there is no air loss from the ventilation duct at the junction of adjacent enclosures. The left and/or right side walls may include a slidable access panel 65, shown in dotted lines in FIG. 1, typically 15 inches high and 9⅝ inches wide, allowing access between an adjoining kennel enclosure also having a slidable panel at a corresponding location. The sliding panels can be mounted by rails made of hardwood or other suitable material. In the preferred embodiment, the upper door is about 4 feet 9½ inches high and 2 feet 3 inches wide. The lower door is about 1 foot 9 inches high and 2 feet 3 inches wide. Each door has about a ⅛ inch gap around its perimeter. The panel of the lower door is preferably fabricated from a ¼ inch thick hardwood plywood panel bordered by ¾ inch by 2½ inch hardwood trim. The panel for the upper door is a window fabricated from 5/32 inch tempered safety glass bordered with ¾ inch by 2½ inch hardwood trim. The window is preferably a transparent sheet about 22⅛ inches wide and 57⅞ inches high which, when trimmed, presents a relatively large transparent opening about 4 feet 4¼ inches high and 1 foot 10 inches wide. Preferably, the upper door extends substantially the entire height and width of the upper section, and the lower door extends substantially the entire height and width of the lower section. The ventilation panel or grate is about 5 inches high by 2 feet 3 inches wide and is fabricated from ½ inch by 3½ inch "Eggcrate". All exposed forward or front facing surfaces or edges of the enclosure are trimmed in or made from hardwood. A preferred hardwood for the enclosure is red oak.

Preferably, the multi-level kennel enclosure is packaged and shipped to an installation site as a stacked array or nested set of unassembled panels with all hardware needed for assembly, and with all parts labeled in order of assembly. The kennel enclosure is to be assembled and installed on a toe space structure constructed at the installation site. A typical toe space structure would be constructed from a suitable number of 2×6 or 2×4 framing boards arranged an appropriate distance on centers.

Figure 5:
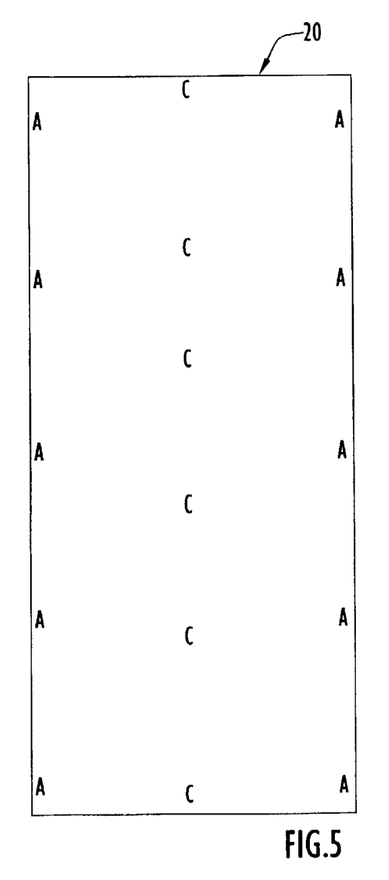
FIG. 5 is a front plan view of the back wall of the multi-level kennel enclosure prior to assembly.
Figure 6:
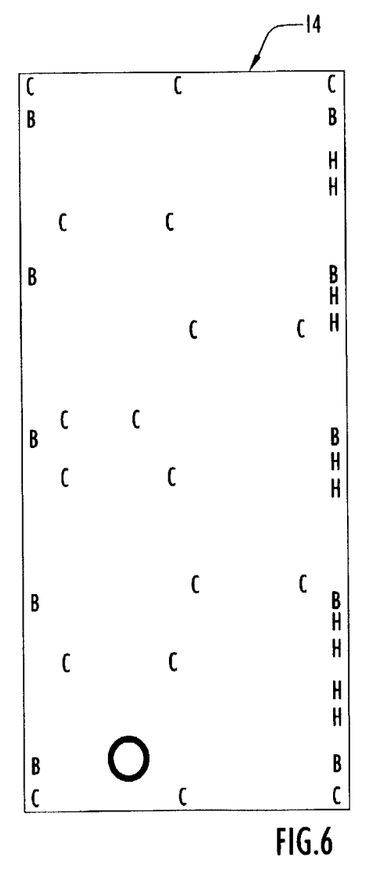
FIG. 6 is a side plan view of the right side wall of the multi-level kennel enclosure prior to assembly.
Figure 7:
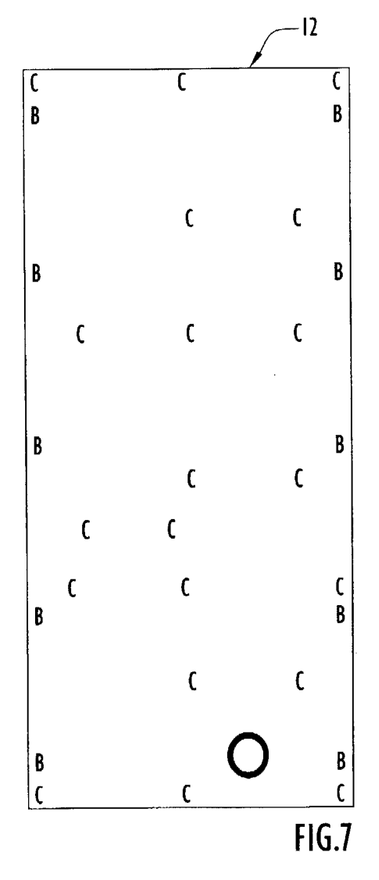
FIG. 7 is a side plan view of the left side wall of the multi-level kennel enclosure prior to assembly.
Figure 8:
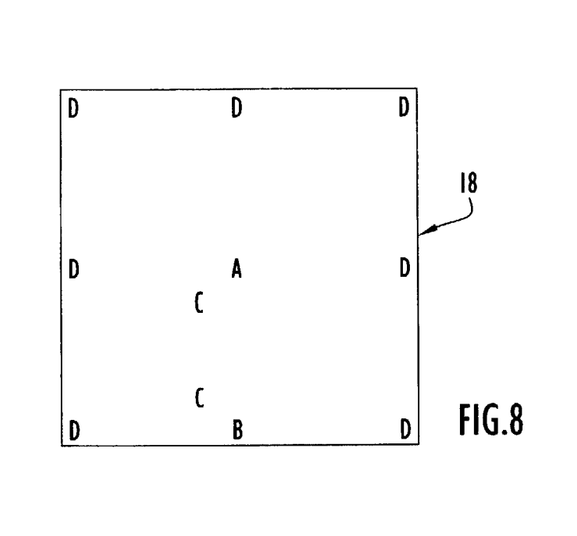
FIG. 8 is a top plan view of the bottom wall of the multi-level kennel enclosure prior to assembly.
Figure 9:
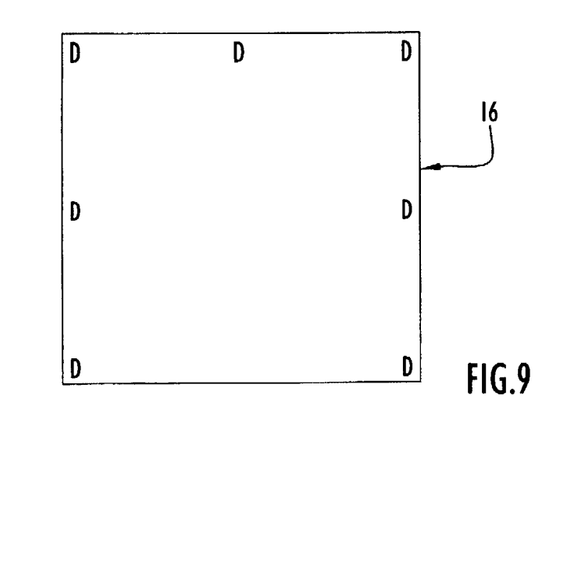
FIG. 9 is a top plan view of the top wall of the multi-level kennel enclosure prior to assembly.
Figure 10:
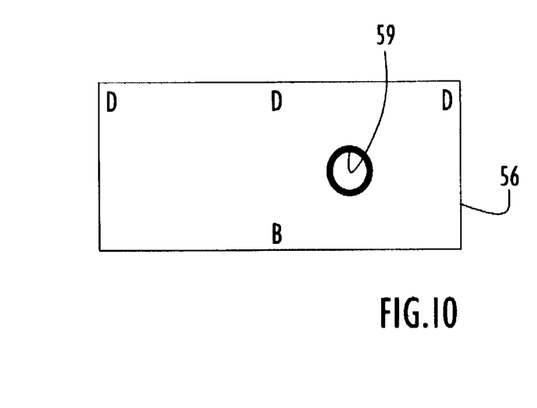
FIG. 10 is a front plan view of the vertical wall of the exhaust housing of the multi-level kennel enclosure prior to assembly.
Figure 11:
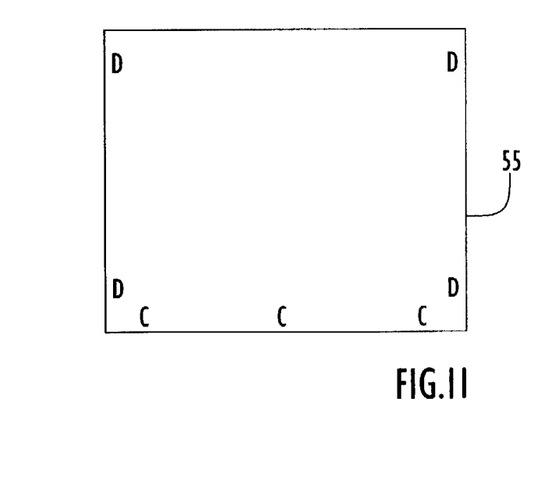
FIG. 11 is a top plan view of the horizontal wall of the exhaust housing of the multi-level kennel enclosure prior to assembly.
Figure 12:
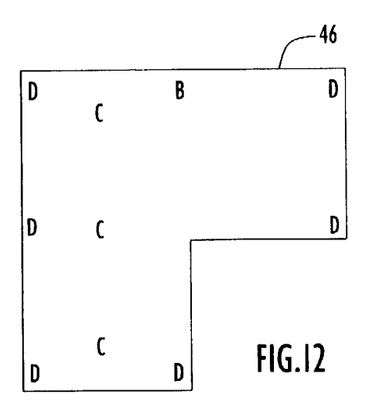
FIG. 12 is a top plan view of the lower shelf of the multi-level kennel enclosure prior to assembly.
Figure 13:
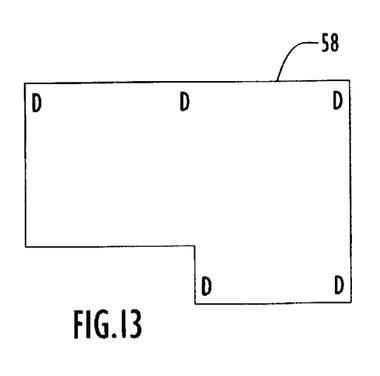
FIG. 13 is a side plan view of the vertical partition of the multi-level kennel enclosure prior to assembly.
Figure 14:
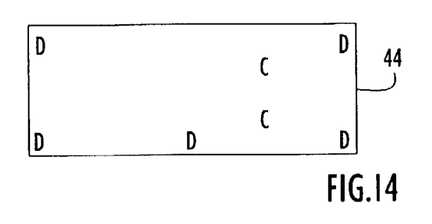
FIG. 14 is a top plan view of the middle shelf of the multi-level kennel enclosure prior to assembly.
Figure 15:
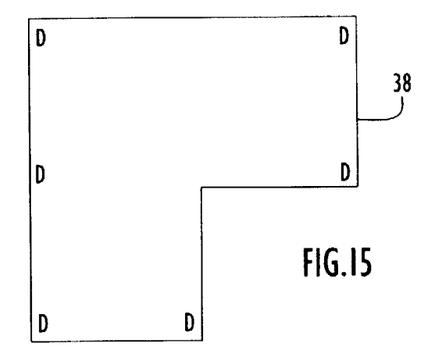
FIG. 15 is a top plan view of the upper shelf of the multi-level kennel enclosure prior to assembly.
Figure 16:
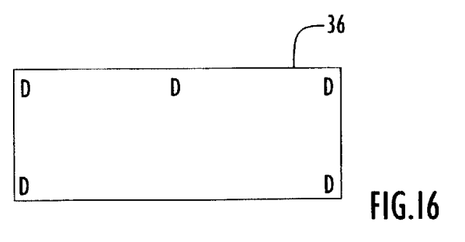
FIG. 16 is a top plan view of the topmost shelf of the multi-level kennel enclosure prior to assembly.

FIGS. 5–16 illustrate various panels of the multi-level kennel enclosure 10 prior to assembly and include indicia in the form of reference letters corresponding to the types of and general locations for hardware to be use in assembling the enclosure as explained further below. FIG. 5 illustrates back wall 20. FIG. 6 illustrates right side wall 14. FIG. 7 illustrates left side wall 12. FIG. 8 illustrates bottom wall 18. FIG. 9 illustrates top wall 16. FIG. 10 illustrates the vertical wall 56. FIG. 11 illustrates the horizontal wall 55. FIG. 12 illustrates the lower shelf 46. FIG. 13 illustrates the partition 58. FIG. 14 illustrates the middle shelf 44. FIG. 15 illustrates the upper shelf 38. FIG. 16 illustrates the topmost shelf 36.

In FIGS. 5 and 8, reference letters A denote the general locations of pre-installed nylon inserts of a first color. Reference letters B in FIGS. 6, 7, 8, 10 and 12 denote the general locations of pre-installed first connectors. In FIGS. 5, 6, 7, 8, 11, 12 and 14, reference letters C denote the general locations of pre-installed nylon inserts of the first color. In FIGS. 8, 9, 10, 11, 12, 13, 14, 15 and 16, reference letters D indicate the general locations of pre-installed second connectors. Reference letters H in FIG. 6 denote the general locations of pre-installed nylon inserts of a second color.

Figure 17:
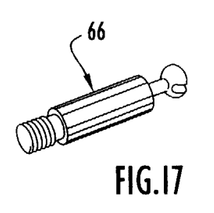
FIG. 17 is a perspective view of a long connector bolt used to assemble the multi-level kennel enclosure.
Figure 18:
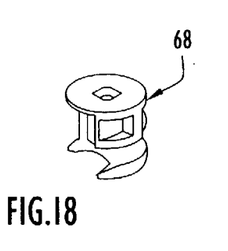
FIG. 18 is a perspective view of a first connector used to assemble the multi-level kennel enclosure.
Figure 19:
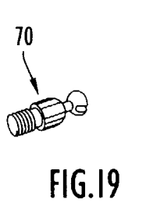
FIG. 19 is a perspective view of a short connector bolt used to assemble the multi-level kennel enclosure.
Figure 20:
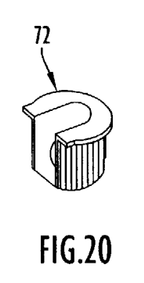
FIG. 20 is a perspective view of a second connector used to assemble the multi-level kennel enclosure.
Figure 21:
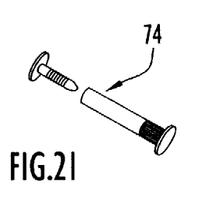
FIG. 21 is a perspective view of a through-bolt connector used to assemble the multi-level kennel enclosure.
Figure 22:
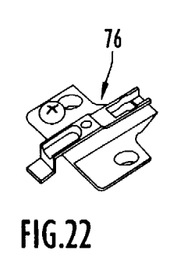
FIG. 22 is a perspective view of a hinge back plate used to mount the upper and lower doors of the multi-level kennel enclosure.
Figure 23:
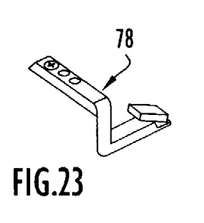
FIG. 23 is a perspective view of a hinge used to mount the upper and lower doors of the multi-level kennel enclosure.
Figure 24:
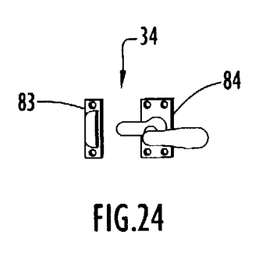
FIG. 24 is a perspective view of a door latch assembly used on the upper and lower doors of the multi-level kennel enclosure.
Figure 25:
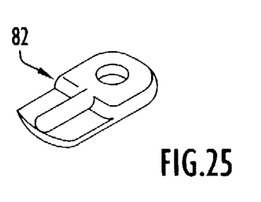
FIG. 25 is a perspective view of a clip used as a door stop and to retain the window of the upper door.

FIGS. 17–25 illustrate hardware used to assemble the multi-level kennel enclosure 10. FIG. 17 illustrates a long connector bolt 66. FIG. 18 illustrates a first connector 68. FIG. 19 illustrates a short connector bolt 70. FIG. 20 illustrates a second connector 72. FIG. 21 illustrates a through-bolt connector 74. FIG. 22 shows a hinge back plate 76. FIG. 23 shows a hinge 78. FIG. 24 shows a latch assembly 34. FIG. 25 illustrates a retaining clip 82. In a single multi-level kennel enclosure 10, twenty-three long connector bolts 66 are required; twenty-three first connectors 68 are required; sixty short connector bolts 70 are required; sixty second connectors 72 are needed; eight through-bolt connectors 74 are needed; six hinge back plates 76 are used; six hinges 78 are used; two latch assemblies 34 are required; and sixteen retaining clips 82 are required.

First connectors 68 are pre-installed, respectively, at locations B in right side wall 14, left side wall 12, bottom wall 18, vertical wall 56 and lower shelf 46. Second connectors 72 are pre-installed, respectively, at locations D in bottom wall 18, top wall 16, vertical wall 56, horizontal wall 55, lower shelf 46, partition 58, middle shelf 44, upper shelf 38 and topmost shelf 36.

In order to assemble the multi-level kennel enclosure 10, long connector bolts 66 are installed, respectively, in the pre-installed nylon inserts at locations A in back wall 20 and bottom wall 18. Short connector bolts 70 are installed, respectively, in the pre-installed nylon inserts at locations C in back wall 20, right side wall 14, left side wall 12, bottom wall 18, horizontal wall 55, lower shelf 46 and middle shelf 44. The long connector bolts 66 located along the left edge (looking at FIG. 5) of the back wall 20 are inserted, respectively, in the first connectors 68 located along the left edge (looking at FIG. 6) of the right side wall 14. Cam locks of the first connectors 68 are tightened via clockwise rotation imparted with a screwdriver, thusly securing the right side wall 14 to the back wall 20. The preceding step is repeated to secure the left side wall 12 to the back wall 20. The short connector bolts 70 at locations C along the bottom edges (looking at FIGS. 6 and 7) of the right side wall 14 and the left side wall 12, respectively, are inserted, respectively, in the second connectors 72 located at corresponding locations D in the bottom wall 18. Cam locks of the second connectors 72 are tightened with a screwdriver to secure the bottom wall 18 to the back wall 20 and the left and right side walls 12 and 14. The preceding step is repeated to secure the top wall 16 to the back wall 20 and the left and right side walls 12 and 14. The vertical wall 56 and the horizontal wall 55 are assembled into an L-shaped unit by inserting the short connector bolts 70 at locations C on the horizontal wall 55 in the second connectors 72 at corresponding locations D in the vertical wall 56 and tightening the cams of the second connectors as previously described. The L-shaped unit is assembled to the back wall and the left and right side walls by assembling the first connectors 68 at locations B on the vertical wall 56 with the long connector bolts 66 at locations A on the bottom wall 18 and by assembling the second connectors 72 at locations D on the horizontal wall 55 with the short connector bolts 70 at corresponding locations C on the left and right side walls in the manner previously described. The lower shelf 46 is positioned on previously installed short connector bolts 70 at the appropriate locations C on the back wall and the right and left side walls. The partition 58 is tipped into place and secured via second connectors 72. The wood front frame is assembled to the front of the left and right side walls and the top and bottom walls of the now upright and partially assembled enclosure via long connector bolts 66 and first connectors 68. The ventilation panel 29 is secured to the partially assembled enclosure using retaining clips 82 installed in pre-drilled holes. Individual enclosures are secured to each other at this point using through-bolt connectors 74 inserted in partially pre-drilled holes, which should be plugged with cover caps (not shown) if not used. The remaining shelves and steps are installed in a manner similar to that described above. The hinges 78 are installed on the rearward faces of the upper and lower doors 26 and 28 and the hinge back plates are installed at corresponding locations on the front of enclosure 10. For ease of assembly, the upper door 26 should initially receive only a top and bottom hinge, with two additional hinges being subsequently installed on the upper door following preliminary installation and adjustment of the upper door. The upper and lower doors are installed by assembling the hinges to the hinge back plates, respectively, to form concealed hinge assemblies. The retaining clips 82 are installed in pre-drilled holes in the back of the wood front frame, such that the clips 82 protrude from the wood front frame and serve to align the upper and lower doors. Two latch assemblies 34 are installed on the enclosure with a first part 83 thereof installed on the wood front frame and a second part 84 thereof installed on the corresponding door. The hinge assemblies are adjusted for lateral, depth and height adjustment and provide an opening angle up to about 105°. The window 30 is installed and secured on the upper door 26 using retaining clips 82 installed in pre-drilled holes. In a preferred embodiment of the multi-level kennel enclosure, "Raefix" hardware is used for assembly of the enclosure.

Figure 2:
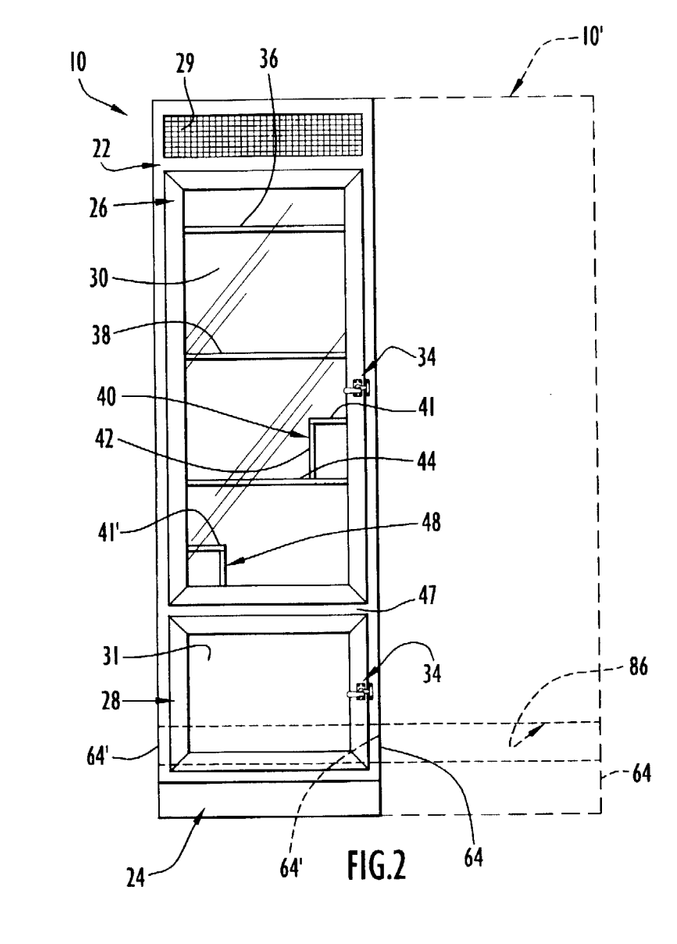
FIG. 2 is a front view of the multi-level kennel enclosure showing the upper and lower doors in the closed position and showing an adjacent multi-level kennel enclosure in dotted lines.

Preferably, two, three or more of the multi-level kennel enclosures 10 are installed in a row, side wall to side wall, forming an array that occupies a relatively small amount of floor space while permitting many cats to be boarded comfortably so that each cat has room to move around within the various levels of its enclosure. FIG. 2 illustrates in dotted lines a second multi-level kennel enclosure 10' arranged side-to-side with multi-level kennel enclosure 10. The ventilation passages, shown in dotted lines, of the individual kennel enclosures 10, 10' are in axial alignment to form a continuous ventilation duct 86 through both enclosures. It is possible to safely confine the cats in a sanitary environment while allowing them to exercise and engage in normal activities. If sliding access panels are provided between adjacent enclosures, it is possible to allow cats from the adjacent enclosures to move freely between the adjacent enclosures when the access panels are open. The cats can be observed by a caretaker through the window of the upper door without requiring that the cats be disturbed and, potentially, allowed to escape. In order to allow inspection of the kennel enclosures at night, optional lighting fixtures may be installed within the interior of the kennel enclosure or light may simply be shown through the window of the upper door to permit visual inspection of the interior. External power switches can be provided for switching on the lights and/or the exhaust devices as needed. Supplies such as fresh litter and/or specific medicaments for a cat within a particular enclosure can be stored in the storage section. Each multi-level kennel enclosure is capable of being assembled, disassembled and reassembled with ease utilizing a minimal number of standard tools and without the need for screwing and/or glueing. Since the enclosures are capable of being assembled and disassembled, they present the advantage of constituting equipment and not permanent fixtures.

Having described preferred embodiments of a new and improved kennel enclosure, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A kennel enclosure for housing relatively small animals such as cats, the kennel enclosure comprising:

a structure defined by left and right side walls, top and bottom walls and back and front walls, said structure enclosing an interior, a shelf mounted in said interior dividing said interior into a living section and a separate toilet section, said shelf having an opening therein allowing an animal within said interior to pass between said living section and said toilet section, said front wall including a first door pivotably movable between an open position providing access to said living section and a closed position closing off said living section, said front wall including a second door pivotably movable between an open position providing access to said toilet section and a closed position closing off said toilet section, said front wall including a ventilation panel permitting the flow of air into said interior, said toilet section defining a space to accommodate a receptacle for holding waste deposited by the animal;

an exhaust housing in said toilet section enclosing a ventilation passage, said exhaust housing having an inlet opening adjacent said space, said inlet opening communicating with said ventilation passage;

at least one outlet opening in one of said left or right side walls communicating and in line with said ventilation passage; and an exhaust device disposed in said exhaust housing and being capable of causing air from outside said structure to be drawn into said interior through said ventilation panel and air within said interior to be drawn into said ventilation passage through said inlet opening for discharge from said structure through said at least one outlet opening, whereby unpleasant odors emanating from the receptacle are forcefully vented from said kennel enclosure.

2. A kennel enclosure as recited in claim 1 wherein said interior includes an upper section between said shelf and said top wall defining said living section and a lower section between said shelf and said bottom wall containing said toilet section, said first door is disposed above said second door and said ventilation panel is disposed above said first door, said first door is pivotably mounted to one of said left or right side walls and said second door is pivotably mounted to one of said left or right side walls.

3. A kennel enclosure as recited in claim 2 wherein said exhaust housing is defined by a horizontal wall and a vertical wall, said horizontal wall extending forwardly from said back wall and extending laterally between said left and right side walls, said vertical wall extending laterally between said left and right side walls and extending downwardly from a forward edge of said horizontal wall to said bottom wall and wherein said space is disposed in front of said vertical wall.

4. A kennel enclosure as recited in claim 3 wherein said ventilation passage extends continuously between said left and right side walls and said inlet opening is disposed in said vertical wall.

5. A kennel enclosure as recited in claim 4 wherein said bottom wall defines a surface for supporting the receptacle.

6. A kennel enclosure as recited in claim 5 wherein said at least one outlet opening includes a first outlet opening in said left side wall and a second outlet opening in said right side wall in axial alignment with said first outlet opening.

7. A kennel enclosure as recited in claim 6 and further including a partition extending vertically in said lower section and dividing said lower section into said toilet section and a storage section.

8. A kennel enclosure as recited in claim 7 wherein said exhaust device includes a fan.

9. A kennel enclosure as recited in claim 7 wherein said structure is adapted to be arranged side by side with another one of said structures, with one of said first or second outlet openings of said structure in alignment with the other of said first or second outlet openings of said another structure.

10. A multi-level kennel enclosure for housing relatively small animals such as cats, the multi-level kennel enclosure comprising:

a rectangular structure formed by left and right side walls, top and bottom walls extending horizontally between said left and right side walls and back and front walls extending vertically between said top and bottom walls, said structure enclosing an interior having a height between said top and bottom walls, a width between said left and right side walls and a depth between said back and front walls, said height being greater than said width and depth, a lower shelf mounted in said interior dividing said interior into an upper section disposed between said lower shelf and said top wall and a lower section disposed between said lower shelf and said bottom wall, said lower shelf having a width and depth substantially equal to said width and depth of said interior such that said upper section is separated from said lower section, said lower shelf having an opening therein allowing an animal within said interior to pass between said upper section and said lower section, a plurality of additional shelves mounted in said interior and dividing said upper section into a plurality of vertical levels between which an animal within said interior can pass, said plurality of additional shelves including a topmost self, an upper shelf and a middle shelf mounted in said interior parallel to said lower shelf to define a first level between said topmost shelf and said top wall, a second level between said upper shelf and said topmost shelf, a third level between said middle shelf and said upper shelf and a fourth level between said lower shelf and said middle shelf, said lower shelf and said additional shelves having solid upper surfaces, respectively, for supporting the animal thereon, said topmost shelf extending laterally between said left and right side walls and forwardly from said back wall to a forward edge, said forward edge being spaced a sufficient distance from said front wall to allow the animal to pass between said first and second levels, said front wall including an upper door pivotably movable between an open position providing access to said upper section and a closed position closing off said upper section, said front wall including a lower door pivotably movable between an open position providing access to said lower section and a closed position closing off said lower section, said lower section defining a space to accommodate a receptacle for holding waste deposited by the animal.

11. A multi-level kennel enclosure as recited in claim 10 wherein said upper shelf extends laterally between said left and right side walls and forwardly from said back wall to a forward edge disposed close to said front wall, said upper shelf having an opening therein to allow the animal to pass between said second and third levels.

12. A multi-level kennel enclosure as recited in claim 10 wherein said middle shelf extends laterally between said left and right side walls and forwardly from said back wall to a forward edge, said forward edge of said middle shelf being spaced a sufficient distance from said front wall to allow the animal to pass between said third and fourth levels.

13. A multi-level kennel enclosure as recited in claim 10 and further including first and second steps disposed on said middle and lower shelves, respectively, each of said first and second steps including a horizontal tread member and a vertical riser member, said tread members having solid upper surfaces, respectively, for supporting the animal thereon.

14. A multi-level kennel enclosure as recited in claim 10 and further including a forced ventilation system within said lower section for venting odors from said interior, said forced ventilation system including an exhaust housing disposed in said lower section and a ventilation passage extending through said exhaust housing, said exhaust housing including a vertical wall extending upwardly from said bottom wall and a horizontal wall extending forwardly from said back wall to said vertical wall, said horizontal wall having a solid upper surface for supporting the animal thereon and defining a fifth level between said lower shelf and said horizontal wall, said lower section including a sixth level defined by said bottom wall.

15. A multi-level kennel enclosure for housing relatively small animals such as cats, the multi-level kennel enclosure comprising:

a rectangular structure formed by left and right side walls, top and bottom walls extending between said left and right side walls and back and front walls extending between said top and bottom walls, said structure enclosing an interior having a height between said top and bottom walls, a width between said left and right side walls and a depth between said back and front walls, said height being greater than said width and depth, a horizontal lower shelf mounted in said interior and having a width and depth substantially equal to said width and said depth, respectively, of said interior so as to divide said interior into an upper section and a separate lower section, said upper section being defined between said lower shelf and said top wall, said lower section being defined between said lower shelf and said bottom wall, said lower shelf having a cut-out therein allowing an animal within said interior to pass between said upper section and said lower section, said front wall including an upper door extending substantially the entire height and width of said upper section and being pivotably movable between an open position providing access to said upper section and a closed position closing off said upper section, said front wall including a lower door extending substantially the entire height and width of said lower section and being pivotably movable between an open position providing access to said lower section and a closed position closing off said lower section, a plurality of additional shelves disposed in said interior and dividing said upper section into a plurality of vertical levels between which the animal within said interior can pass, said lower section defining a space to accommodate a receptacle for holding waste deposited by the animal, said left, right, top, bottom and back walls, said lower shelf and said additional shelves all being made of respective planar panels capable of being assembled to form said structure and capable of being disassembled and reassembled, said upper door including a panel removably mounted on one of said left or right side walls and said lower door including a panel removably mounted on one of said left or right side walls whereby said structure can be packaged and shipped as a stacked array of panels.

16. A multi-level kennel enclosure as recited in claim 15 wherein said panels of said upper and lower doors are solid and said panel of said upper door is a window.

17. A multi-level kennel enclosure as recited in claim 15 wherein said structure further includes one or more steps supported on one or more of said additional shelves, respectively, and each of said steps includes a horizontal tread member and a vertical riser member formed by planar panels, respectively, capable of being assembled to form said one or more steps and capable of being disassembled and reassembled.

18. A multi-level kennel enclosure as recited in claim 17 and further including an exhaust housing in said lower section formed of horizontal and vertical walls extending between said left and right side walls, said horizontal and vertical walls being formed by planar panels, respectively, capable of being assembled to form said exhaust housing and capable of being disassembled and reassembled.

19. A kennel enclosure for housing relatively small animals such as cats, the kennel enclosure comprising:

a structure defined by left and right side walls, top and bottom walls and back and front walls, said structure enclosing an interior, a shelf mounted in said interior dividing said interior into an upper section and a separate lower section, said shelf having an opening therein allowing an animal within said interior to pass between said upper section and said lower section, said front wall including a first door pivotably movable between an open position providing access to said upper section and a closed position closing off said upper section, said front wall including a second door pivotably movable between an open position providing access to said lower section and a closed position closing off said lower section, a ventilation passage in said lower section enclosed by a horizontal wall and a vertical wall, said horizontal wall being disposed between said bottom wall and said shelf, said horizontal wall extending forwardly from said back wall to a forward edge and extending laterally between said left and right side walls, said vertical wall extending downwardly from said forward edge to said bottom wall and extending laterally between said left and right side walls, said vertical wall being disposed inwardly of said second door in said closed position to define a toilet section between said vertical wall and said second door in said closed position, said bottom wall defining a surface in said toilet section for supporting a receptacle for holding waste deposited by the animal, a ventilation inlet opening in said vertical wall establishing communication between said toilet section and said ventilation passage, and at least one ventilation outlet opening in at least one of said left or right side walls communicating and in alignment with said ventilation passage.

20. A multi-level kennel enclosure for housing relatively small animals such as cats, the multi-level kennel enclosure comprising:

a rectangular structure formed by left and right side walls, top and bottom walls extending between said left and right side walls and back and front walls extending between said top and bottom walls, said structure enclosing an interior having a height between said top and bottom walls, a width between said left and right side walls and a depth between said back and front walls, said height being greater than said width and depth, a horizontal lower shelf mounted in said interior and having a width and depth substantially equal to said width and said depth, respectively, of said interior so as to divide said interior into an upper section and a separate lower section, said upper section being defined between said lower shelf and said top wall, said lower section being defined between said lower shelf and said bottom wall, said lower shelf having a cut-out therein allowing an animal within said interior to pass between said upper section and said lower section, said front wall including an upper door pivotably movable between an open position and a closed position to selectively provide access to said upper section, said front wall including a lower door pivotably movable between an open position and a closed position to selectively provide access to said lower section, a plurality of additional shelves disposed in said interior and dividing said upper section into a plurality of vertical levels between which the animal within said interior can pass, said lower section defining a space to accommodate a receptacle for holding waste deposited by the animal, said left, right, top, bottom and back walls, said lower shelf and said additional shelves all being made of respective planar panels capable of being assembled to form said structure and capable of being disassembled and reassembled, said upper door and said lower door including removably mounted panels, respectively, whereby said structure can be packaged and shipped as a stacked array of panels.

* * * * *

Disclaimer

6,318,295 — Paul W. Wade, Manchester, ME. MULTI-LEVEL KENNEL ENCLOSURE WITH FORCED VENTILATION. Patent dated Nov. 20, 2001. Disclaimers filed Jul. 2, 2003, by the inventor.

Hereby enters this disclaimer to claims 10, 11, 12, and 13, of said patent.

*(Official Gazette, June 21, 2005)*